US006407960B1

(12) United States Patent
Egbert et al.

(10) Patent No.: US 6,407,960 B1
(45) Date of Patent: Jun. 18, 2002

(54) ARRANGEMENT FOR PROGRAMMING SELECTED DEVICE REGISTERS DURING INITIALIZATION FROM AN EXTERNAL MEMORY

(75) Inventors: Chandan Egbert, San Jose; Marufa Kaniz, Sunnyvale, both of CA (US)

(73) Assignee: Advanced Micro Devices, Sunnyvale, CA (US)

( * ) Notice: Subject to any disclaimer, the term of this patent is extended or adjusted under 35 U.S.C. 154(b) by 103 days.

(21) Appl. No.: 09/654,831

(22) Filed: Sep. 1, 2000

(51) Int. Cl.$^7$ ................................................ G11C 8/00
(52) U.S. Cl. ........................... 365/230.04; 365/185.01; 365/189.12; 710/10; 710/314
(58) Field of Search ...................... 365/185.01, 189.12, 365/230.04; 710/314, 10

(56) References Cited

U.S. PATENT DOCUMENTS 5,884,027 A * 3/1999 Garbus et al. .............. 710/314

5,953,335 A 9/1999 Erimli et al.
6,185,630 B1 * 2/2001 Simmons ..................... 710/10

OTHER PUBLICATIONS

AMD, "PCnet™–FAST+Enhanced 10/100 Mbps PCI Ethernet Controller with OnNow Support", Feb. 1998, Publication No. 21485, pp. 1–4 and 85–87.

* cited by examiner

Primary Examiner—Vu A. Le
(74) Attorney, Agent, or Firm—Leon R. Turkevich

(57) ABSTRACT

An integrated device includes an external memory interface that includes address decoding logic configured for identifying a destination device register based on register address information retrieved from an external memory. The external memory interface, upon identifying the destination device register, loads the destination device register with register data read from the external memory, for example contiguously following the corresponding register address information. Hence, the integrated device can be programmed on a per register basis, without the necessity of an EEPROM map.

20 Claims, 2 Drawing Sheets ously following the corresponding register address information. Hence, the integrated device can be programmed on a per register basis, without the necessity of an EEPROM map.

ARRANGEMENT FOR PROGRAMMING SELECTED DEVICE REGISTERS DURING INITIALIZATION FROM AN EXTERNAL MEMORY

BACKGROUND OF THE INVENTION

1. Field of the Invention

The present invention relates to initialization of devices, for example network interface controller devices or integrated network switch devices, using a read only memory device such as an EEPROM.

2. Background Art

Complex chip devices such as Ethernet (IEEE 802.3) controllers typically have control registers that need to be programmed with values for operation. One arrangement for loading the values into the registers is to store the values on-chip during chip fabrication by hardwiring the values using gate transistors. The hardwiring of values on the chip, however, severely restricts the flexibility in programming the registers during power on reset: designers of the device may have selected hardwired values that are different from values preferred by users of the device. Hence, users of the device may need to overwrite the default values using a processor unit such as a central processing unit (CPU) as a host for the device. Use of a host CPU, however, increases the cost of a system.

Chip devices also may include an EEPROM interface for programming of the chip. For example, the commercially-available Am79C972 PCne™-FAST+10/100 Mbps PCI Ethernet Controller from Advanced Micro Devices, Inc. of Sunnyvale, Calif., includes an EEPROM interface for programming the controller using an EEPROM. In particular, the Am79C972 Data Sheet specifies that the Am79C972 controller EEPROM interface includes EEPROM detection circuitry configured for detecting the presence of an attached EEPROM in response to a reset of the device (e.g., deassertion of a reset pin). If the detection circuitry detects a connected EEPROM, the EEPROM interface automatically begins to read serial data via from the EEPROM via a single data pin into prescribed registers according to a prescribed read sequence, illustrated typically using an EEPROM map. Hence, the Am79C972 controller can be programmed automatically using an EEPROM.

The automatic programming of a chip device using an EEPROM, however, still assumes that only certain device registers are programmed in a prescribed read sequence as specified by the corresponding EEPROM map. For example, a chip designer may assume that a first fixed set of registers should not be specified in the EEPROM map because they should be loaded only once with hardwired values upon reset, and that a second fixed set of registers should be specified in the EEPROM map because they should be accessible by the user for overwriting the default values. The assumptions by the designer may not be entirely correct, such that the hardwired values loaded into the first fixed set of registers (i.e., those registers not specified in the EEPROM map) may not be the values desired by the user. Hence, users may still need a host CPU to overwrite the hardwired default values for registers that are not specified within the EEPROM map.

SUMMARY OF THE INVENTION

There is a need for an arrangement that enables any register within a chip device to be selectively programmed by an external memory, such as an EEPROM.

There is also a need for arrangement that enables users to program registers of an integrated device during device initialization without the necessity of programming an external memory, such as an EEPROM, according to a prescribed device register map that specifies programming of the registers in a prescribed sequence.

These and other needs are attained by the present invention, where an integrated device includes an external memory interface that includes address decoding logic configured for identifying a destination device register based on register address information retrieved from an external memory. The external memory interface, upon identifying the destination device register, loads the destination device register with register data read from the external memory, for example contiguously following the corresponding register address information. Hence, the integrated device can be programmed on a per register basis, without the necessity of an EEPROM map.

One aspect of the present invention provides a method in an integrated device. The method includes reading from an external memory a register address value that identifies a destination device register within the integrated device, and reading from the external memory a register data value for the identified destination device register. The method also includes storing the register data value in the destination device register based on the corresponding register address value. The reading of the register address value from the external memory enables users of the integrated device to enjoy maximum flexibility in choosing the registers to initialize. In addition, the storing of the register data value based on the corresponding register address value enables the device to be programmed, using an external memory, without the necessity of prescribed memory mapping schemes such as an EEPROM map.

Another aspect of the present invention provides an integrated device comprising a plurality of device registers each having a corresponding register address value, and an external memory interface. The external memory interface is configured for reading register data values from an external memory, and includes address decoding logic configured for identifying for each read register data value a corresponding one of the device registers based on reading the corresponding register address value from the external memory. Hence, the device registers can be selectively programmed based on reading the register address values from the external memory.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
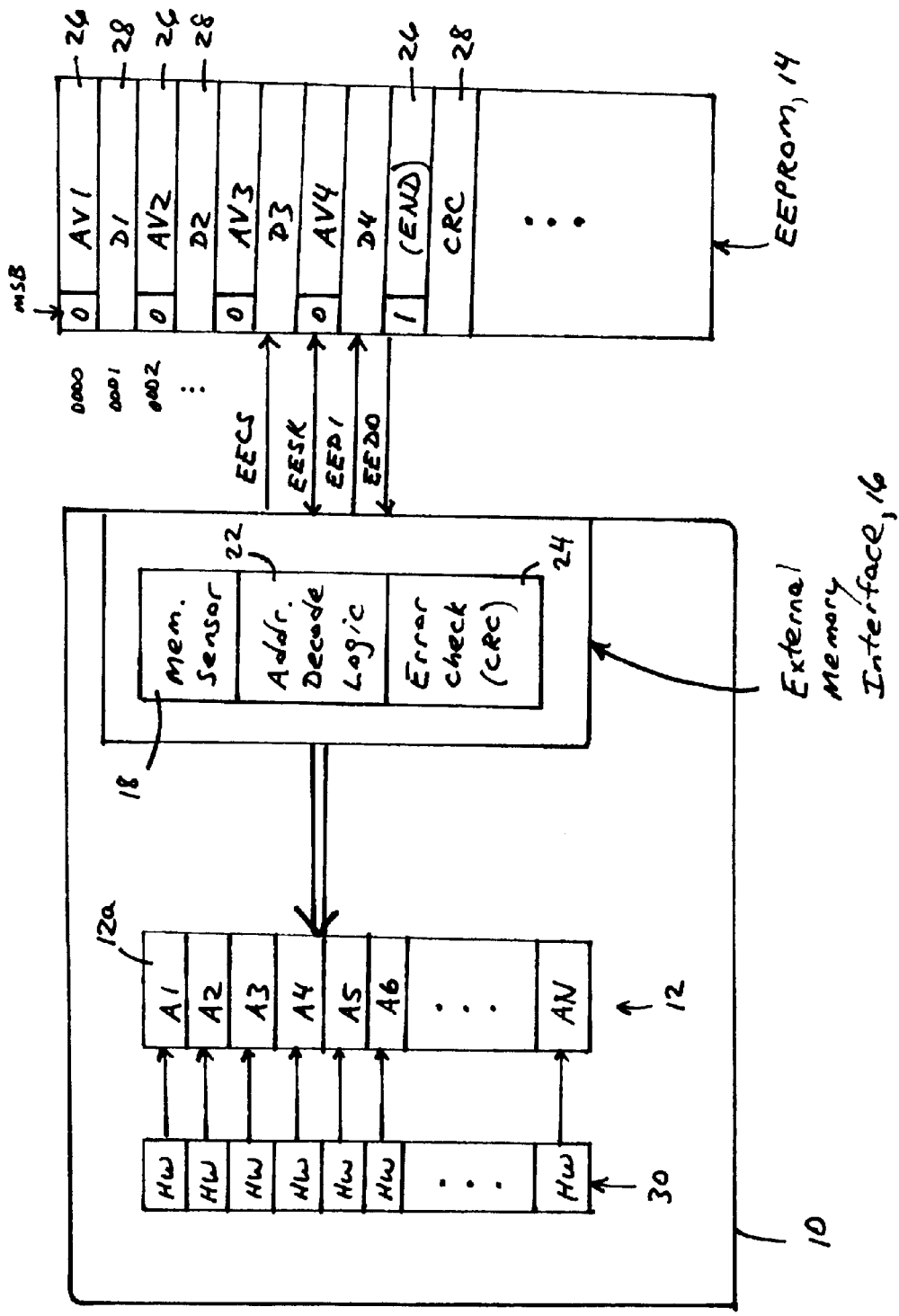
FIG. 1 is a diagram illustrating the arrangement for programming selected registers of an integrated device using an external memory, such as an EEPROM, according to an embodiment of the present invention.

FIG. 1 is a diagram illustrating an integrated device 10, such as an integrated network controller or network switch, configured for programming selected registers 12 using an external memory 14 based on register address values read from the external memory 14. The integrated device 10 includes an external memory interface 16 configured for reading the values of the external memory 14 via a serial data output connection (EEDO). The external memory interface 16 also includes pin connections for a chip select signal (EECS), a serial clock (EESK), and a serial data input (EEDI) used for programming of the external memory 14.

The external memory 14, for example an EEPROM, is configured (i.e., programmed) for storing a plurality of register address values (AV) in even-numbered locations 26, and a plurality of register data values (D1) stored in odd-numbered locations 28 within the memory 14. In particular, each register address value/register data value pair is used for programming the device register 12 specified by the register address value with the corresponding register data value. For example, the address value "AV1" may specify the address "A1" of a device register 12a, and the register data value "D1" may represent the value to be written into the corresponding device register 12a having the address "A1".

Hence, the device registers 12 may be selectively programmed with register data values stored in the external memory 14, even after the device registers 12 have been initially programmed during power on reset with hardwired values obtained from hardwired gate transistors 30.

The external memory interface 16 includes a memory sensor 18 configured for determining the presence of the connected external memory 14, address decoder logic 20, and an error checking circuit 24. The address decoder logic 20 is configured for identifying destination device registers 12 (e.g., A1) from register address values (e.g., AV1) retrieved from even-numbered memory locations 26 in the external memory 14. The register address values (e.g., AV1) stored in the external memory 14 specify the destination device registers 12 (e.g., A1) for storage of respective register data values (e.g., D1) stored in odd-numbered memory locations 28 within the external memory 14.

Figure 2:
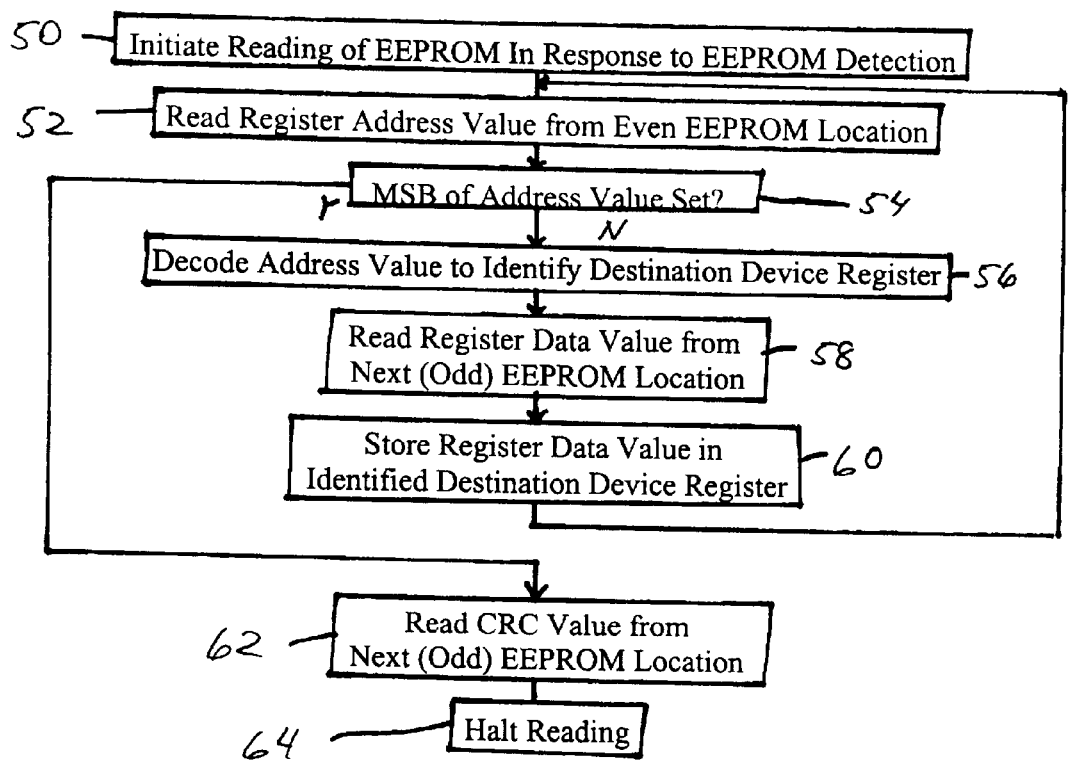
FIG. 2 is a diagram illustrating the method of initializing selected registers of an integrated device, based on register address values read from an external memory, according to an embodiment of the present invention.

FIG. 2 is a diagram illustrating the method by the external memory interface 16 of storing register data values in selected device registers 12 according to an embodiment of the present invention. The external memory interface 16 initiates reading of the external memory 14 in step 50 following a detected reset condition on the device 10 and in response to detection of the external memory device 14 by the memory sensor 18. In particular, the external memory interface 16 begins reading the first memory location (address 0000) of the external memory 14, which corresponds to an even-numbered location 26. The address decoder logic 22 reads the register address value (e.g., AV1) from the even memory location 26 in step 52, and determines in step 54 whether the most significant bit (MSB) of the register address value is set to 1. If in step 54 the most significant bit of the address value is set to 1, indicating that programming using the external memory 14 is to be halted, the external memory interface 16 jumps to step 62, described below.

If in step 54 the most significant bit of the register address value read from the external memory 14 is not set, the address decoding logic 22 decodes in step 56 the address value to identify the destination device register 12 (e.g., A1). The external memory interface 16 then reads in step 58 the next odd memory location 28 in order to read the register data value to be written into the identified destination device register 12. The external memory interface 16 then stores in step 60 the register data value (e.g., D1) into the identified destination device register (e.g., A1) 12 as specified by the corresponding register address value (e.g., AV1).

The reading of register address values and respective register data values from the external memory 14, and the storing of the register data values into the identified destination device registers 12 continues until detection of an address value in an even memory location having a most significant bit set to 1. In response to detecting in step 54 an address value having the most significant bit set to one, the external memory interface 16 reads a cyclic redundancy check (CRC) value from the next on memory location in step 62, and halts reading of the external memory 14 in step 64. The error checking circuit 24 can then validate the memory data based on the retrieved CRC value.

Hence, the registers 12 within the integrated device 10 can be selectively programmed using an external memory 14 that stores register address values that specify respective destination device registers within the integrated device 10, and respective register data values. Selection of destination device registers 12 is based solely on the stored register address values in the even memory locations 26. Moreover, the external memory 14 can be programmed to override default values in any one of the registers 12, based on the register address values stored in the external memory.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated device comprising:
   reading from an external memory a register address value that identifies a destination device register within the integrated device;
   reading from the external memory a register data value for the identified destination device register; and
   storing the register data value in the destination device register based on the corresponding register address value.

2. The method of claim 1, further comprising initiating reading of the register address value in response to detecting a presence of the external memory.

3. The method of claim 1, wherein the step of reading the register data value includes reading the register data value contiguously following the corresponding register address value.

4. The method of claim 3, further comprising repeating the reading of multiple register address values and register data values for storage of the register data values in respective identified destination device registers within the integrated device.

5. The method of claim 4, further comprising halting the reading of the external memory based on detecting an end value from the external memory.

6. The method of claim 5, wherein the halting step includes detecting the end value in a terminal register address value stored in the external memory.

7. The method of claim 6, wherein the detecting step includes identifying the end value based on the terminal register address value having a most significant bit set.

8. The method of claim 6, wherein the halting step includes identifying the terminal register address value based on the reading thereof from an even numbered location of the external memory.

9. The method of claim 3, further comprising repeating the reading of multiple register address values and register data values for storage of the register data values in respective identified destination device registers within the integrated device.

10. The method of claim 9, further comprising halting the reading of the external memory based on detecting an end value from the external memory.

11. The method of claim 10, wherein the halting step includes detecting the end value in a terminal register address value stored in the external memory.

12. The method of claim 11, wherein the detecting step includes identifying the end value based on the terminal register address value having a most significant bit set.

13. The method of claim 11, wherein the halting step includes identifying the terminal register address value based on the reading thereof from an even numbered location of the external memory.

14. The method of claim 9, wherein the step of reading each register address value includes reading from a corresponding even numbered location of the external memory.

15. The method of claim 14, wherein the step of reading each register data value includes reading from a corresponding odd numbered location of the external memory.

16. An integrated device comprising:
    a plurality of device registers each having a corresponding register address value; and
    an external memory interface configured for reading register data values from an external memory, the external memory interface having address decoding logic configured for identifying for each read register data value a corresponding one of the device registers based on reading the corresponding register address value from the external memory.

17. The device of claim 16, wherein the external memory interface is configured for reading the register address values from the external memory at even numbered locations in the external memory.

18. The device of claim 17, wherein the address decoding logic is configured for terminating reading of the external memory in response to detecting an end value in one of the even numbered locations in the external memory.

19. The device of claim 18, wherein the external memory interface is configured for reading the register data values from odd numbered locations in the external memory.

20. The device of claim 19, wherein the external memory interface further includes error checking logic configured for determining integrity of the data in the external memory based on a cyclic redundancy check value read from the odd numbered location in the external memory contiguously following the even numbered location storing the end value.

* * * * *